Figure 1:
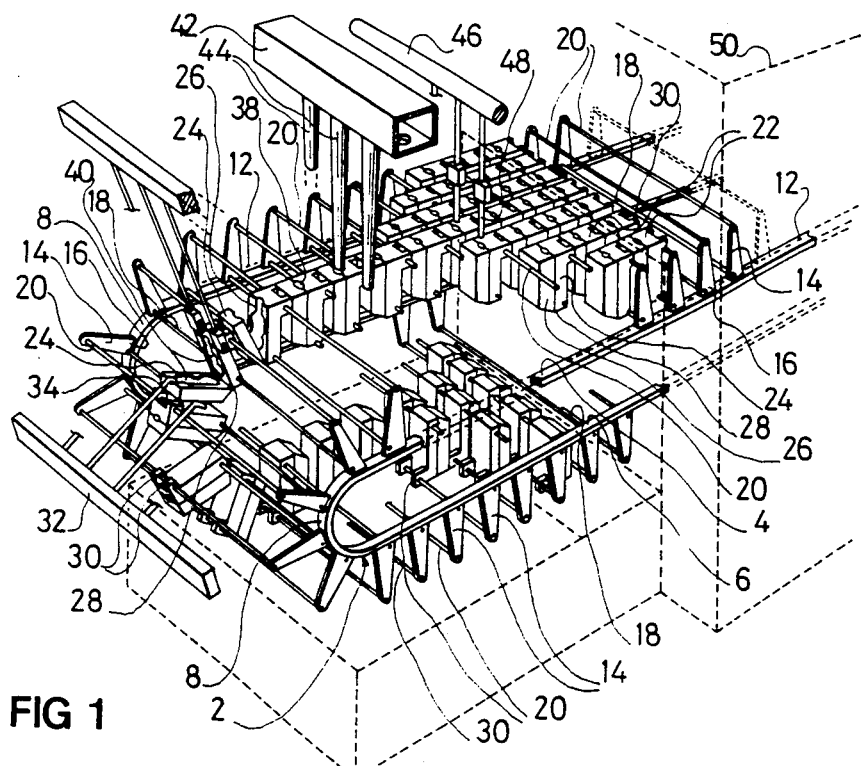

United States Patent [19]

Waldström

[11] Patent Number: 4,548,573

[45] Date of Patent: Oct. 22, 1985

[54] METHOD AND AN APPARATUS FOR PRODUCING MOULDED CONFECTION ARTICLES

[75] Inventor: Ejvind Waldström, Hundslund, Denmark

[73] Assignee: O. G. Hoyer A/S, Hojbjerg, Denmark

[21] Appl. No.: 548,821

[22] Filed: Nov. 4, 1983

[30] Foreign Application Priority Data

Nov. 5, 1982 [DK] Denmark ............................ 4909/82

[51] Int. Cl.⁴ ........................ B29D 31/00; A23G 9/26
[52] U.S. Cl. ...................................... 425/442; 62/345; 62/380; 425/126 S; 425/451
[58] Field of Search ............. 426/515; 425/451, 451.2, 425/126 S, 126 R, 442, 451.9, 451.5, 450.1, 425/451.6, 436 R, 438, 575, 539, 259, 126; 164/430, 164/330; 53/122, 222, 581, 594; 62/266, 345, 356, 62/380, 381, 63, 64

[56] References Cited

U.S. PATENT DOCUMENTS

| | | | |
|---|---|---|---|
| 1,981,862 | 11/1934 | Groset et al. | 425/348 S |
| 2,006,376 | 7/1935 | Vogt | 53/122 |
| 3,304,689 | 2/1967 | Reichel | 62/380 |
| 3,993,119 | 11/1976 | Scott | 164/330 |
| 4,038,007 | 7/1977 | Griner et al. | 425/259 |

Primary Examiner—W. E. Hoag
Attorney, Agent, or Firm—Antonelli, Terry & Wands

[57] ABSTRACT

Frozen confection articles are produced in non-enveloped, openable moulds by subjecting the closed moulds to an innoxious freezing medium such as very cold air. An apparatus for producing such frozen or moulded articles comprises a plurality of parallel, endless rows of moulds moving along a closed path of straightlined and curved configurations, these moulds each consisting of opposed, mutually hinged mould parts, which are forced together during motion along the straightlined parts of said path, as corresponding to setting or freezing zones, while the moulds are openable for discharging of the hardened or frozen products as they are guided along the curved path, in which the moulds diverge from each other and thus provide space for the opening thereof.

11 Claims, 7 Drawing Figures

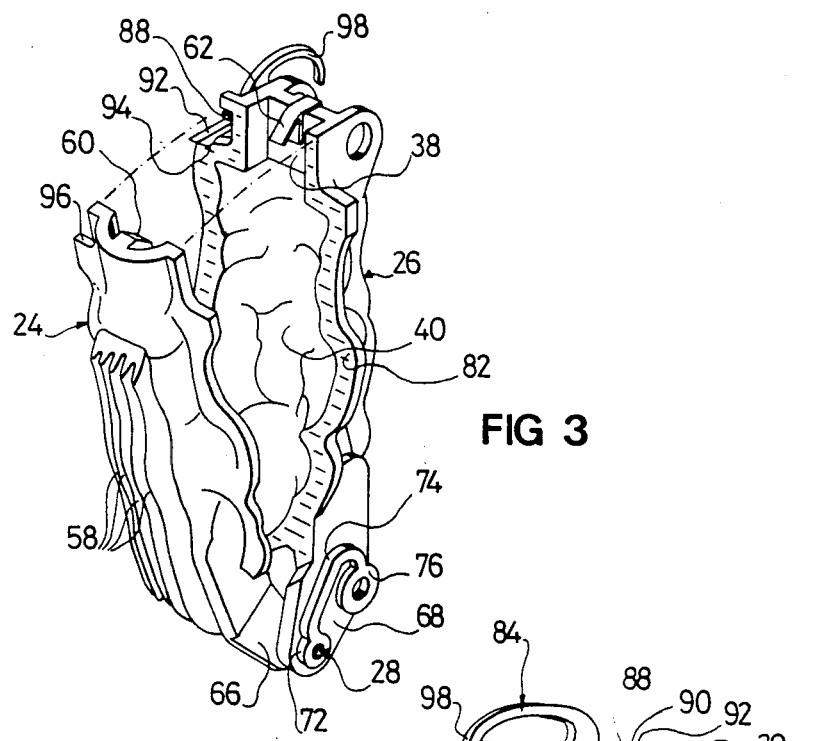
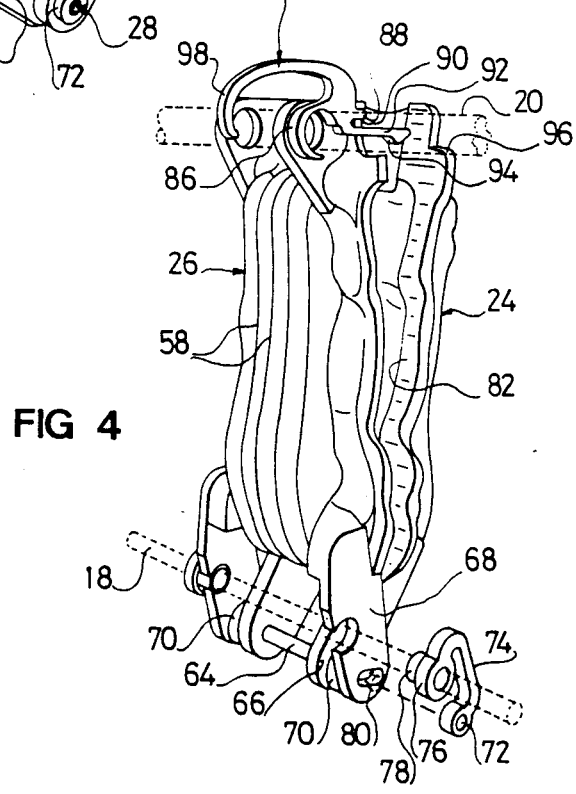

METHOD AND AN APPARATUS FOR PRODUCING MOULDED CONFECTION ARTICLES

The present invention relates to a method of manufacturing moulded frozen confection products such as icecream lollies and, especially, products of such a complex shape that the products cannot be frozen or produced in simple, open moulds, from which the products would not be retractable since such products must be produced in moulds, which are either resilient or openable for permitting removal of the products.

Various methods have already been suggested for producing icecream lollies and similar frozen products of complex shape. According to one known method lolly members are produced in the usual manner, viz. by freezing the lollies in open freezing moulds or pockets as conveying through a brine bath, and the surface thereof, and then successively lifting off the frozen products from the moulds and subjecting them to a deformation pressure treatment between opposed die members. However, better results are achievable by other known methods, by which the icecream or limonade is frozen in a similar manner, but in freezing pockets of the desired complex shape and consisting of a flexible and resilient material, such that the products, having passed through the brine bath in these freezing pockets, are removable by a heeling off operation of the pockets.

A still better result is obtainable by yet another known method, whereby the moulds consist of two opposed, rigid mould parts, which are laid together and placed in the said usual, open freezing pockets so as to form a retractable and separable inner freezing mould therein. However, the heat transmission between the brine bath and the product or liquid to be frozen is not too effective, as the heat (or cold) passes through an almost unavoidable air layer between the mould and the inside of the freezing pocket. Moreover, the handling of the moulds is rather complicated.

The invention relates to a method of the last mentioned type, i.e. by which the products are frozen in moulds, each of which comprise opposed, separable mould parts, are moved along a freezing zone and then separated for removal of the frozen products therefrom, and it is the purpose of the invention to provide an industrial method, which is usable both with high quality product results and in an economical and easy manner.

According to the invention the moulds, upon being closed and filled with non-frozen product material, are moved along the freezing zone in non-enveloped condition, and the freezing is effected by subjecting the moulds to an innoxious freezing medium such as cold air. Thus, when using an innoxious freezing medium, the openable moulds need not be received in outer freezing pockets as otherwise necessary for safeguarding the products from intrusion of salt brine. The freezing medium, therefore, may act directly on the outside of the moulds, whereby the heat or cold transfer can be very effective. The rigid mould parts may be of aluminium or another material with good heat conductivity. The moulds will be easy to handle, as they can just be opened and closed, without being retracted from and reinserted in any outer freezing pocket.

The moulds, when closed, should of course be tightly closed, though except for an upper filling opening, but the sealing requirements will not be absolute, as they would be if the moulds were subjected to a food noxious freezing medium such as usual brine.

In order to close tightly against each other the mould parts will normally have to be forced together with a considerable pressure, and according to the invention this is particularly easily achieved when the moulds are openable by a relative displacement of the opposed mould parts in the combined length and moving direction of the row of moulds; hereby, inversely, the mould parts will be forced firmly together when care is taken that the entire row of moulds is maintained compressed in its length direction, as exemplified below. Of course, the arrangement should be such, then, that the moulds as successively approaching the discharge station are accelerated from the end of the row for providing sufficient space for the opening of the moulds. Preferably the mould parts are hinged to each other at one end of the mould so as to be openable by mutual pivoting.

The invention furthermore relates to an apparatus for manufacturing moulded or frozen products in accordance with the above principles, as further specified in the appended claims. In the preferred embodiment the apparatus comprises an endless chain structure as carrying a plurality of parallel, endless rows of moulds, each of these rows being moved along at least one straight track, in which the successive, closely juxtaposed moulds are held under compression lengthwise of the row, and along at least one curved track, in which the single moulds diverge naturally outwardly from each other, whereby sufficient space for the opening of the moulds will exist in this area.

Figure 2:
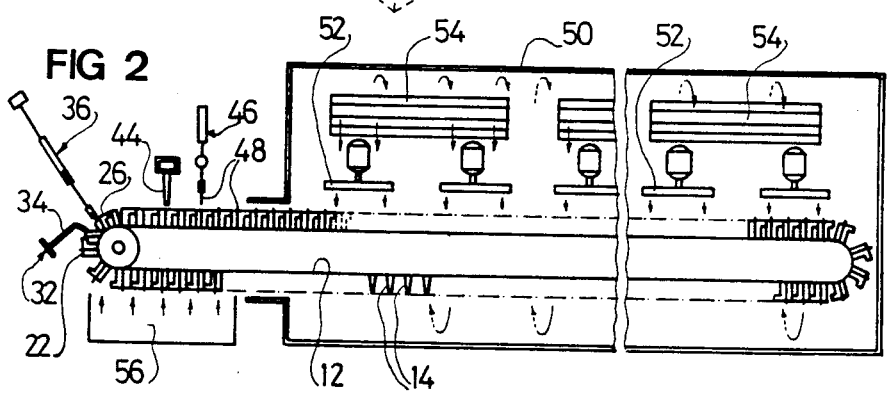
Figure 7:
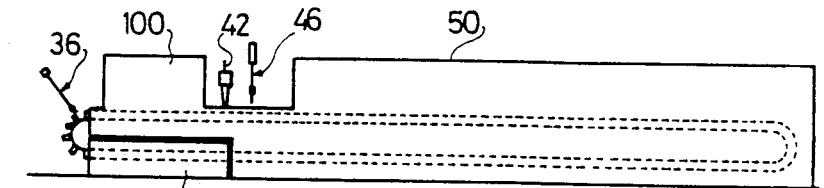
Figure 5:
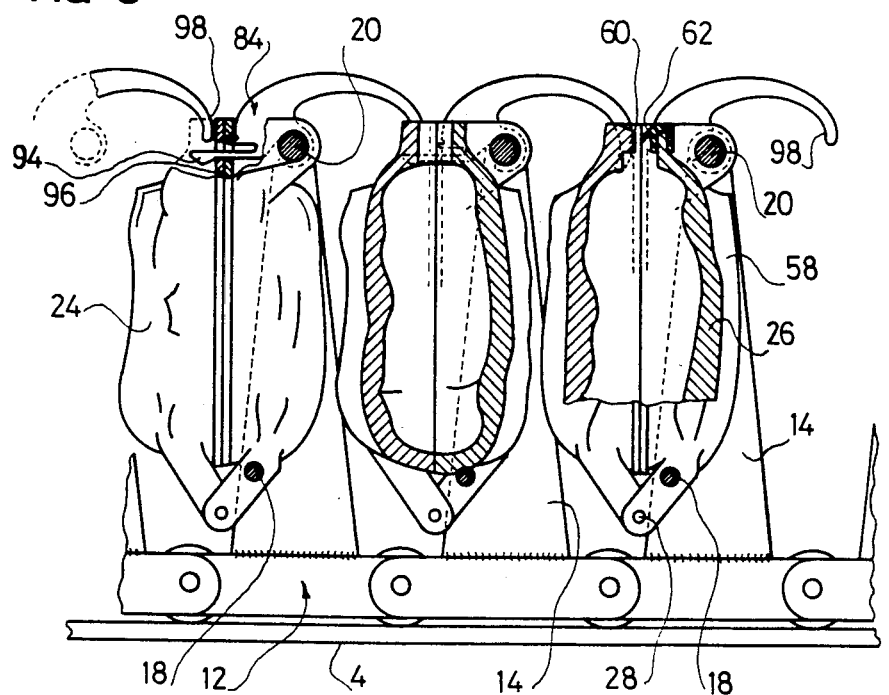
Figure 6:
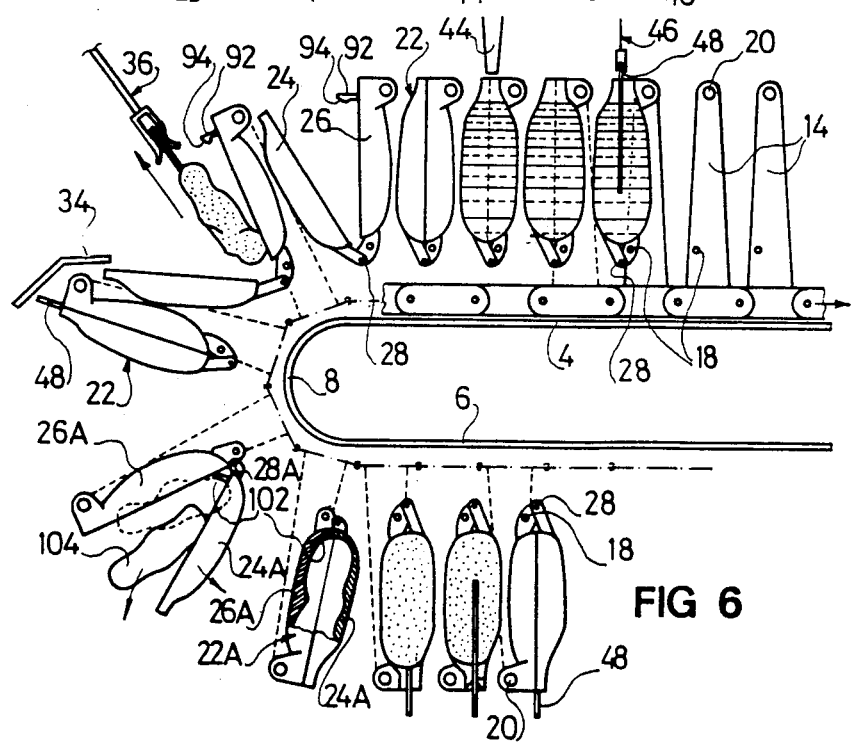

In the following the invention will be described in more detail with reference to the drawing, in which:

FIG. 1 is a schematic perspective view, partly in section, of one end of an apparatus according to the invention, FIG. 2 is a schematic side view of the apparatus, FIG. 3 is a perspective view of a mould for use therein, FIG. 4 is a similar view shown from the opposite side, FIG. 5 is a side view of a few consecutive moulds, FIG. 6 is a side view of the front end of the apparatus, shown in more detail, FIG. 7 is a schematic side view of a modified apparatus.

The apparatus as shown schematically in FIGS. 1 and 2 comprises a chassis provided with two opposed, fixed guiding rails 2 each having an upper horizontal portion 4 and a lower horizontal portion 6, a front half circular portion 8 and a corresponding rear portion 10. About each guiding rail body 2 and slidingly along the outside thereof is arranged a chain 12 provided with a large number of brackets 14, each projecting outwardly from the guiding rail body 2. Each bracket 14 has a broad base portion 16, which engages the guiding rail body 2 and is, adjacent one side or end thereof, provided with a hole for receiving and rigidly holding an inner cross bar 18 as extending between the respective opposed brackets 14. The brackets 14 project as symmetrical triangular members having at their outer ends a hole for receiving and rigidly holding an outer cross bar 20 as extending, like the bars 18, between respective opposed brackets 14. In this manner, as the chains 12 are driven in the direction shown by an arrow, the brackets 14, crossbars 18, and outer crossbars 20 will be moved in a continuous row, and while the brackets 14 will be generally parallel when moving along the straight horizontal rail portion 4 and lower horizontal rail portion 6, they will diverge from each other when moving along the curved or have circular end rail portions 8, 10. In the latter situation the distance between the inner cross bars 18 at the consecutive transverse structures will be practically unchanged, while the distance between the outer cross bars 20 is increased considerably. The chains 12 are kept pronounced tight, thereby the brackets 14 are stabilized in their positions perpendicular to the rail portion, with which they cooperate. The chains 12 are driven by suitable sprocket or indexing means (not shown).

On each transverse structure including the brackets 14, cross-bars 18, and outer cross bars 20 is mounted, on the cross bars 18 and 20, a transverse row of moulds 22. For easy description, reference will first be made to the moulds 22 as present in the upper straight run of the chains 12. Each of these moulds include two opposed mould parts 24, 26, of which only the latter is secured to the two cross bars 18, 20, while the part 24 is secured to the part 26 by means of a lower hinge 28. The mould part 26 has a body portion, the lower end of which is provided with a hole for receiving the inner or lower cross rod 18, while the top end thereof has a forwardly, as viewed in the moving direction, projecting portion 30 with a hole for receiving the upper cross bar 20. The front end of the projection 30 abuts the top of the rear side of the mould part 24 of the preceding mould 22, and the rear side of the mould part 24 of the considered mould 22 is, itself, engaged by the projection 30 of the following mould. Thus, the total thickness of the closed moulds corresponds to the distance between the consecutive transverse structures of the brackets 14, crossbars 18, and outer crossbars 20, such that the moulds are kept firmly closed by their interengagement. As described more fully below, buffer springs may be arranged between the moulds 22, whereby the closing pressure may be adjusted to a well defined, high value irrespective of mechanical tolerances in the system.

The moulds appearing in the lower run of the chains 12 are of course designed in the same manner, only they assume an upside down position.

When the moulds 22 of the lower run, on their respective transverse structures enter the curved rail portions 8 and are moved upwardly therealong the engagement between the consecutive moulds 22 will be released, because a leading mould 22 will be swung away from its following mould 22 due to the increased distance between the outer cross bars 20. Hereafter an opening of the mould 22 by rearward pivoting of the mould part 24 about the hinge 28 will no longer be prevented by the presence of the following mould 22, and an opening tendency will exist by the forces of gravity because the pivotal mould part is here located generally underneath the guided mould part 26. However, the moulds 22 are not necessarily opened hereby, as the mould parts may stick together or be snap locked to each other.

As illustrated in the left hand portion of FIGS. 1 and 2, an element 32 having protruding finger members 34 may be used for opening the moulds, with the finger members 34 having hooked outer ends, which are engageable with the outer ends of the mould parts 24 so as to hold these back while the associated mould parts 26 are moved or swung further as guided by the curved rail portions 8, whereby the moulds are effectively opened, as most clearly shown in FIG. 1. Often it will be preferred, however, that the fingers 34 are actively moved for opening the moulds while the latter stand still.

Any moulded members inside the moulds may now be removed from the opened moulds, e.g. by retraction means generally designated by the reference numeral 36 and described more fully below.

The mould part 24 as pivoted about the hinge 28 into its open position will be backed by engaging the projection 30 of the following mould 22. In the following phase, upon removal of the moulded member from the mould, the following mould 22, as now being opened itself, will cause the mould 22 part 24 of the preceding mould to initiate a pivoting towards its closed position, because the distance between the considered outer cross bars 20 will now start to decrease, once the leading transverse structure has entered into the upper straight run of the chains 12. Soon thereafter, or by a following indexing movement of the chains, the leading mould 22 will be completely closed, namely when the following transverse structure has also reached the straight run of the chains 12. A mould closing pressure will be built up thereby, and this pressure will be stabilized as also the next following few transverse structures enter the straight upper run of the chains 12. Each newly entered single bracket 14 may not be able to take up the full closing pressure as exerted on its outer cross bar 20, because this pressure exerts a considerable rearward tilting momentum on the bracket 14, but already when assisted by only a few following brackets 14 having entered the straight run, the bracket 14 will then resist even a high closing force on the moulds 22.

The moulds 22 are provided with outer inlet holes 38 as formed by opposed half cylindrical recesses in the respective opposed mould parts 24, 26, these holes leading to an inner mould cavity as defined by opposed broader half-cavities 40 in the respective mould parts 24, 26.

When, according to the foregoing, the moulds 22 have been closed and their closing force has been stabilized, the moulds 22 are moved past a filling station, in which a filling manifold 42, having depending filling spouts 44, is caused to dispense, in known manner, a predetermined volume of a liquid product material into each of the mould cavities through the filling holes 38, for filling out the cavities underneath these holes.

In case of an apparatus for producing frozen lollies as provided with a handle stick, the relevant sticks may be supplied to the moulds by means of a conventional stick supply system 46, which operates to introduce sticks 48 down through the filling holes 38. As described below the mould parts 24 and 26 are provided with means for holding the sticks 48 in a required centered position.

Thereafter the filled moulds 22 as provided with handle sticks 48 are moved continually or stepwise along the entire upper run of the chains 12, whereby they are moved through a freezing tunnel 50, in which they are subjected to cold air, e.g. at a temperature of ca. $-40°$ C. In a preferred system the air is blown downwardly by means of blowers 52 as forcing the air through refrigerated heat exchangers 54, and air guiding means (not shown) may be provided for recirculating the air from the bottom of the tunnel 50 to above the heat exchangers 54.

At the rear end of the tunnel 50 the chains 12 will pass downwardly along the half-circular rail portions 10. During the associated movement of the moulds 22 the collective closing force on the moulds will be relieved, but at least there will be no natural opening tendency of the moulds 22, because the pivotable mould parts 24 are here located topwise on the guided mould parts 26, whereby the force of gravity seeks to hold the moulds 22 closed. However, by the freezing action already exerted along the upper run of the chains 12, the contents of the moulds 22 will already be frozen to such a degree that an outermost frozen shell has been developed inside the moulds, whereby no leak of liquid product material will occur, despite the fully relieved exterior closing pressure. A certain closing pressure may be maintained, if the mould parts are interlocked by the said snap lock means, but normally this closing action will be unimportant at the rear end of the tunnel 50 or chain and guide system 12,2.

The moulds 22, as leaving the freezing tunnel 50 along the lower run 6 should, prior to being opened by the fingers 34, be subjected to a heating in order to make the moulds more easily openable. This may be accomplished by arranging a warm air blower system 56 underneath the front end of the circulating mould system, such that the moulds 22 are heated for surface heating of the frozen products just before the opening phase is entered.

In practice it is desirable that the moulds 22 are not opened until they reach the position, in which the outer ends of the handle sticks are gripped by the retraction means 36. The retraction means, in their turn, may be constituted by stick engaging tools as well known from conventional lolly freezing machines, though here operating in a slightly inclined position for retraction or lifting off of the lollies from the inclined opened moulds. Conventionally, the retraction means 36 will lift off the lollies vertically from vertically oriented, open moulds, and then be rearwardly pivoted for delivery of the lollies to a suitable packaging equipment. Thus, the entire retraction system may be quite conventional, except for the retraction position being slightly inclined. As a result of the retraction taking place adjacent the top side of the curved rail end portions 8 the moulds 22 should remain closed as they are swung outwardly and upwardly upon having passed the warm air station 56. However, the moulds 22 may be liable to open, because the pivoted mould parts 24 might now be openable by gravity, and it is important, therefore, that means such as snap lock means are provided for preventing such unintentional or undue opening of the moulds 22.

Already from the above description it will be appreciated that the apparatus as shown in FIGS. 1. and 2 will be able to produce frozen confection products of any complex (or non-complex) shape, but it will be understood that such production is not limited to products requiring freezing, i.e. cooling below 0° C., since the straightlined run or runs of the chains 12 may represent any other cooling or setting function of the material as filled into the moulds 22. The removal of the final products is not even conditioned by the products being provided with a protruding and seizable stick member, as the products may be removed from the opened moulds 22 otherwise than by gripping of exposed stick portions.

In FIGS. 3 and 4 is shown a practical design of one of the freezing moulds 22 as mounted on the cross bars 18 and 20. It comprises mould parts 24 and 26 of aluminium as provided with vertically extending cooling fins 58, the cross section of the closed mould being roughly circular, whereby the moulds 22, even when closely juxtaposed, will define open freezing air passages between them. Topwise in one of the opposed inlet hole portions 38 is arranged a rigid inwardly protruding stick holding portion 60, while an opposed stick holder 62 is constituted by a leaf spring member.

Bottomwise the hinge 28 is constituted by a plastic hinge pin 64 extending through aligned holes in respective lower hinge bracket portions 66 and 68 as mutually spaced or centered by plastic washers 70. The outer ends of the pins 64 are held in respective plastic eyelets 72, each of which being located at one end of a resiliently flexible plastic rod member 74, the other end of which is integrally shaped with another eyelet 76 having an inwardly projecting collar portion 78 as received in a hole in the bracket 68, whereby the mould part 26 is held on the cross bar 18 by intermediate of the plastic eyelet 72. The hinge pin 64, by itself or by means of filler bushings, fills out the circular hinge holes in the brackets 66, but the corresponding holes 80, in the brackets 68 are elongated in the horizontal direction. The plastic member 72,74,76 is designed so as to normally hold the hinge pin 64 in a position adjacent the end of the elongated hole 80 nearest to the eyelet 76, even strongly resiliently biased against this end or side of the elongated hole. The purpose of this arrangement will be clear from the following description:

The mould parts 24 and 26, of course, should be closable so as to engage each other sealingly between opposed surface portions 82 encircling the respective half cavities 40. These surface portions, 82, should be planar, and optionally one of them should be provided with a sealing strip such as a rubber string embedded in a groove all the way down and up between the opposed edges of the upper inlet hole passage 38. Preferably, of course, each and all of the many moulds 22 of the apparatus should be entirely sealingly closed solely by their upper ends being forced together, and this condition sets high requirements for the accuracy, with which the cooperating closing surfaces 82 and the hinges 28 are shaped and placed.

As mentioned, an important feature of the apparatus shown in that a high closing pressure is produced between the upper ends of the mould parts, and of course the moulds should be designed in such a manner that this pressure is converted into a generally high closing pressure all along the surfaces 82 as surrounding the half cavities 40.

Now, it might happen that a stick 48 or some other "impurity" accidentally gets disposed between the opposed surfaces 82 just above the hinge area 28, by falling down thereagainst, and in such case the upper, high closing pressure would result in an extremely high opening force or momentum on the lower hinge portion of the mould, whereby the hinge pin 64 would be liable to break. However, due to the hinge holes 80 being horizontally elongated, the result will be that the bracket 68 is displaced relative the hinge pin 64, against the action of the resiliently bendable rod portion 74, such that the top portions of the mould parts may be forced firmly together without causing the hinge pin 64 to break. The mould, of course, will not be bottomwise sealingly closed, i.e. the liquid product material may flow out of the mould, but the mould structure has not been subjected to a breakdown, and the said "impurity" may soon be removed from the particular mould as unmasked by general inspection, whereafter the same mould is immediately operative again, without the apparatus even having to be stopped.

Topwise of the mould part 26 is mounted a resilient plastic member 84 having a portion 86 at least partially encircling the upper cross rod 20, a rearwardly projecting arm portion 88, which is received in a recess 90 in the rigid top portion of the mould part 26 so as to anchor the member 84 in the position shown, a rearwardly projecting arm portion 92, the outer end of which is shaped as a snap lock portion 94 cooperating with a ridge portion 96 on the opposed mould part 24, and a forwardly protruding, curved arm portion 98, which serves as a spring means for engaging the rear side of the preceding mould 22 or rather the mould part 24 thereof.

Thus, the snap lock arm 92,94 will serve to hold the mould 22 closed until it is forcibly opened by the finger members 34 or any similar structure, and the curved spring portion 98 will serve to transfer the relatively high closing pressure from one mould 22 to the next in the row of moulds. When such or a similar spring member is used between the consecutive moulds 22 in the single rows of moulds 22, the closing force will be substantially the same on all moulds 22 despite possible tolerances with respect to the exact distance between the consecutive transverse structures.

FIG. 5 shows in more detail the run of the moulds 22 along the upper straight portions of the guiding rails 2, and FIG. 6, correspondingly detailed, shows the run of the moulds along the curved front end portions 8 of the rails 2.

With particular reference to FIG. 7 it should be mentioned that as far as a freezing apparatus is concerned it will be possible to prefreeze the moulds 22, prior to the filling thereof, such that the filled in material will freeze very rapidly in the outermost layer thereof and thus weaken the necessity of the mould 22 being absolutely sealingly closed. It should be considered, moreover, that the frozen products to be retracted from the moulds 22 should not necessarily be through-frozen, when they are only surface frozen for showing the required self carrying stability for their further handling, inasfar as a final through-freezing may be subsequently carried out in a relevant freezing store.

In FIG. 7 it is illustrated that the freezing tunnel 50 may include a portion 100 located between the discharge station 36 and the filling station 42,44, whereby the moulds 22 will already be very cold when they receive the liquid product material, which is thereby caused to freeze, almost instantaneously, in all surface areas adjacent to the inner wall areas of the mould cavity 40, whereby leakage from slightly untight moulds is counteracted. A possible alternative would be to effect the discharge at or outside the other end of the tunnel 50, whereby the entire lower run of the mould chain will be usable for prefreezing the moulds 22.

It may be desirable to produce stickless confection members, and this, of course, will be possible by suitable adaptation of the means for removing the products from the opened moulds. By way of example it is illustrated in FIG. 6, lower left corner, that moulds 22A may be used, of which one mould part, 24A, may be bottomwise provided with a finger portion or "teaspoon" rejector portion 102, which projects into a complementary recess in the mould cavity surface of the opposed mould part, 26A, such that the "teaspoon" portion 102, when the mould 22 is opened, will act as a rejector lever for forcing the moulded product 104 out of the mould part 26A. When properly surface heated by the heating section 56, the product 104 will then readily fall out of the mould 22. For special adaptation it may be desirable, as shown, to arrange the mould hinge 28A quite close to the bottom of the mould cavity. The "teaspoon" portion 102 may be a separately pivotal element, which is actuated well after initial opening of the mould, e.g. by virtue of an outer knob on the mould part 24A abutting an outer lever portion of the pivotal arm 102. The mould part 24A should be thaw-heated better than the part 26A such that by the initial opening the frozen body remains in the part 26A until it is later rejected therefrom by the rejector 102. Hereby a gentle and welldefined demoulding will be ensured.

As mentioned, the moulds 22 are preferably made of aluminium, but the mould cavity walls may be covered or coated by a thin layer of stainless steel or a suitable plastic material, if required.

Especially for the handling of articles to be frozen it is an important feature that the mould parts are held together by spring action as by the springs 98, 74 in FIGS. 4, 5, because the moulds 22 are hereby able to expand as required by the expansion tendency of the articles as being frozen.

It will be appreciated that the disclosed apparatus may be largely modified within the scope of the invention, already because it will be perfectly usable, without the freezing tunnel 50, for producing moulded products which do not require active freezing for the setting or hardening of the products. Moreover, both the method and the apparatus according to the invention, as far as product freezing is concerned, may be modified by arranging for the moulds 22 to be passed through a freezing zone, in which the moulds 22 are subjected to a gaseous freezing medium other than air or even to a liquid, but still an innoxious freezing medium. Such a medium, normally, will be more expensive than ordinary salt brine, but it will be appreciated that both from an investment and an operational point of view the associated advantage of a lacking or unnecessary enveloping of the openable moulds will be much more important in practice.

What is claimed is:

1. An apparatus for manufacturing moulded or frozen products, the apparatus comprising plural rows of individual moulds and means for moving the rows of individual moulds successively through a filling station, a setting or freezing zone and a discharge station, said rows being disposed transversely of the direction of said moving, each of the moulds comprising opposed, separable mould parts, which, in said discharge station, are caused to be separated for removal of the product, characterized in that the moulds are openable generally in the direction of moving, and that guiding means are provided for holding the consecutive moulds as moved along said setting or freezing zone mutually spaced insufficiently for operational opening of the moulds, while, in or before said discharge station, means are provided for increasing the mutual distance between the rows sufficiently to permit operational opening of the moulds for discharge of the moulded products therefrom, said means for opening the moulds being separate from said means for increasing the mutual distance between the rows.

2. An apparatus according to claim 1, in which the guiding means are designed so as to cause the consecutive moulds as moving along the setting or freezing zone to abut each other with a considerable pressure to thereby provide for the desired closing forces on the individual moulds.

3. An apparatus according to claim 1, in which the moulds are arranged on an endless closed conveyor means having a substantially straight run in the setting or freezing zone and a curved run through said discharge station, the moulds being arranged on the conveyor means such that the moulds of consecutive rows are closely juxtaposed along said straight run, while in the CURVED run the consecutive moulds diverge from each other with a generally increased mutual spacing.

4. An apparatus according to claim 3, in which the opposed mould parts forming the individual moulds are pivotally hinged to each other adjacent a mould end located relatively closest to a center of said curved path.

5. An apparatus according to claim 3, in which the moulds are mounted on carrier bars extending between opposed mould parts thereof, while the other mould part is associated with the first part in an openable manner, preferably by being hinged thereto at one end of the mould.

6. An apparatus according to claim 2, in which buffer spring means are provided between the consecutive moulds.

7. An apparatus according to claim 1, in which the mould parts are held together by resilient snap lock means.

8. An apparatus according to claim 4, in which the hinge connection between the two mould parts is designed so as to permit resilient mutual displacement of the opposed hinge portions in case of excessive displacement forces being created therebetween.

9. An apparatus according to claim 1, in which said setting or freezing zone comprises means for subjecting non-enveloped moulds to a freezing medium such as cold air, and in which the freezing zone is extended to include a section for prefreezing the moulds recirculating between the discharge station and the filling station.

10. An apparatus according to claim 7, in which the resilient snap lock means are designed unitarily with the buffer spring means provided between the consecutive moulds.

11. An apparatus for manufacturing moulded or frozen products, the apparatus comprising a row of individual moulds each comprising two opposed mould parts forming respective opposed walls of a casting hinged together adjacent one common end area thereof so as to be openable and closeable by a relative pivoting about a hinge axis oriented transversely of a length of said row of individual moulds, opposite end areas of the mould parts being retractable from each other generally along said length, the first mould parts adjacent said opposite end areas being connected with respective support members in a support structure defining stabilized mutual location of said support members, compression spring means interposed directly between said opposite end areas of said first mould parts and said opposite end areas of said second mould parts of the respective neighboring moulds in said row of individual moulds, means provided for enlarging a distance along the length between the consecutive moulds so as to effectively disengage the neighboring moulds from an action of said interposed spring means and thus permit the mould parts to be readily opened.

* * * * *